United States Patent Office 2,767,221
Patented Oct. 16, 1956

2,767,221
PRODUCTION OF UNSATURATED ALCOHOLS

Seaver A. Ballard, Orinda, and Harry de V. Finch, Berkeley, Calif., and Elbert A. Peterson, Silver Spring, Md., assignors to Shell Development Company, Emeryville, Calif., a corporation of Delaware No Drawing. Application June 11, 1953,
Serial No. 361,066

13 Claims. (Cl. 260—638)

This invention relates to a process for the production of unsaturated alcohols. More particularly, the present invention relates to a process for the production of unsaturated alcohols having an olefinic bond in the beta-gamma position by catalytic selective reduction of the formyl group of corresponding unsaturated aldehydes having an olefinic bond in the alpha,beta position, i. e., of alpha,beta-olefinic aldehydes. The invention particularly concerns a method for accomplishing catalytic selective reduction of alpha-methylidene aldehydes whereby the formyl group is preferentially and selectively reduced to the corresponding alcohol radical, without concomitant reduction of the olefinic linkage of the alpha-methylidene group, thereby directly producing the beta-methylidene alcohol that corresponds to the unsaturated carbonylic reactant.

It is known in the prior art that alpha,beta-olefinic aldehydes and ketones can be hydrogenated by treatment with molecular hydrogen in the presence of a suitable hydrogenation catalyst. Various catalysts have been employed and conditions of temperature and hydrogen pressures representative of suitable hydrogenating conditions have been used. In virtually every case it has been found that the hydrogen adds preferentially to the olefinic linkage between the alpha carbon atom and the beta carbon atom of the unsaturated carbonylic reactant, with the result that the products are the saturated aldehyde or ketone corresponding to the carbonylic reactant, or even the corresponding saturated alcohol. In only isolated instances, and under special conditions, has preferential addition of the hydrogen to the unsaturated linkage of the carbonyl group been observed. Insofar as we are aware, there has been described in the prior art no catalytic hydrogenation process wherein the unsaturated linkage of the carbonyl group of an alpha-methylene carbonyl compound (aldehyde or ketone) has been preferentially hydrogenated by treatment with molecular hydrogen in the presence of a hydrogenation catalyst to produce the corresponding unsaturated alcohol, i. e., without substantial prior or concomitant reduction or saturation of the olefinic linkage of the alpha-methylene group.

It also is known from the prior art that certain olefinically unsaturated carbonyl compounds wherein the olefinic linkage is non-conjugate to the unsaturated linkage of the carbonyl group, i. e., the olefinic carbon atoms are separated from the carbon atom of the carbonyl group by one or more intervening atoms of carbon, may be converted to the corresponding unsaturated alcohol by treatment with molecular hydrogen in the presence of certain hydrogenation catalysts under mild reaction conditions. The alpha-methylidene aldehydes wherein there is a vinylidene group in conjugate relation to the unsaturated linkage of the carbonyl group, when treated with molecular hydrogen in the presence of hydrogenation catalysts and even under mild reaction conditions, unlike the non-conjugate olefinically unsaturated carbonyl compounds are converted principally to the corresponding saturated aldehyde and saturated alcohol. There thus has been need for a direct, practical, generally applicable method for effecting the selective reduction of the alpha-methylidene aldehydes to produce the corresponding beta, gamma-olefinically unsaturated alcohols, and this need has not been fulfilled, to the best of our knowledge, by the processes that are available from the prior art.

A particular and important object of the invention is a process for converting alpha-methylidene aldehydes to produce beta-methylidene alcohols. A method for selectively reducing the formyl group of an alpha-methylidene alkanal by reaction of the alpha-methylidene alkanal with a non-tertiary alcohol to produce the corresponding beta-methylidene alkanol forms a further object of the invention. Effective conditions of operation form yet another object of the invention, and still further objects of the invention will become apparent from the nature of the disclosures and claims herein.

It has been discovered in accordance with the present invention that alpha-methylidene alkanals, which heretofore upon catalytic hydrogenation generally have been converted to saturated aldehydes, or even to saturated alcohols, can be preferentially or selectively reduced to the corresponding beta,gamma-olefinic alcohols by reaction with a non-tertiary alcohol in the presence of certain catalysts essentially comprising one or more metal oxides. By means of the present process, acrolein can be reduced to allyl alcohol in high yields. Methacrolein, when reduced according to the process of the invention, is converted to methallyl alcohol with only negligible, if any, amounts of other products of reduction. The alpha-methylidene aldehydes which are employed in the process of the invention have the structure represented by the formula

$$CH_2=\overset{R}{\underset{|}{C}}-CHO$$

in which R is a lower saturated aliphatic hydrocarbon radical, i. e., an alkyl group, the alpha-methylidene alkanal containing from 3 to 10 carbon atoms. Acrolein, methacrolein, alpha-ethylacrolein and their near higher homologs having the above structure comprise the alpha-methylidene aldehydes which are employed according to the invention.

The alcohols which are employed in the process of the invention are converted in and by the reaction with the alpha-methylidene alkanal to the carbonyl compound (aldehyde or ketone) corresponding to the alcohol. The alcohol used in the process thus should be a non-tertiary alcohol, that is, an alcohol having both the hydroxyl group and at least one atom of hydrogen directly substituted on one and the same carbon atom. From the standpoint of convenience, availability, and cost, the lower unsubstituted primary and secondary aliphatic alcohols are especially suitable, although the operable scope of the invention is not limited thereto. For example, the alcohol may be a cyclic alcohol, having both hydrogen and hydroxyl bonded to a ring carbon atom, or the alcohol may be one containing a benzenoid ring, such as the benzene ring or a substituted benzene ring. Benzyl alcohol, for example, can be used with excellent results. The alcohol may be substituted to a minor extent by inert substituents which do not alter the essentially hydrocarbon nature of the residue to which the hydroxyl group is bonded, although it generally is preferred to employ an unsubstituted alcohol, that is, one composed of the hydroxyl group and the hydrocarbon residue to which the hydroxyl group is bonded. Representative alcohols which may be employed include, among others, methyl alcohol, ethyl alcohol, propyl alcohol, isopropyl alcohol, butanol-1, isobutyl alcohol, secondary butyl alcohol, amyl alcohol, secondary amyl alcohol, hexyl alcohol, methyl isobutyl carbinol, allyl alcohol, methyl vinyl carbinol, crotyl alcohol, allyl carbinol, penten-1-ol-5, benzyl alcohol, 2-phenethyl alcohol, phenyl methyl carbinol, cyclohexanol, cyclohexenol, cyclohexyl carbinol, and the like, and their homologs and analogs. Although any suitable primary or secondary alcohol may be employed, it is preferred to employ the lower primary or secondary alkanols, particularly those containing up to about five carbon atoms, since they are readily available and give excellent results when employed in the process. The primary alcohols, such as ethanol, are particularly preferred.

The catalysts which are employed in accordance with the invention comprise at least one oxide of a metal selected from the second group of the periodic table, preferably having associated therewith a metal or a compound thereof, of the general class known to those skilled in the art and generally referred to as hydrogenation-dehydrogenation catalysts. The group II metal oxides generally referred to and known as the alkaline earth metal oxides, i. e., the oxides of calcium, strontium, barium and magnesium and mixtures comprising an alkaline earth metal oxide having in association therewith one or more hydrogenating-dehydrogenating metals or compounds of metals, constitute the preferred catalysts of the invention. Outstanding in their efficacy are the catalysts comprising magnesium oxide. While the alkaline earth metal oxides alone may be employed as the catalysts for the production of the desired beta,gamma-olefinic alcohol in high yields according to the process of the invention, compound or mixed catalysts comprising an alkaline earth metal oxide and a hydrogenating-dehydrogenating metal or compound of a metal generally give even superior conversions to and yields of the desired beta,gamma-olefinic alcohol. As the component of the catalyst that is referred to as a hydrogenating-dehydrogenating metal or compound of a metal there may be mentioned in particular the heavy metals, as such, or in the form of their oxides, sulfides, complexes thereof, etc., e. g., iron, copper, zinc, tantalum, chromium, nickel, molybdenum, tungsten, cobalt, and manganese. The preferred heavy metals are selected from the first, second, sixth and eighth groups of the periodic table of the elements.

A valuable group of catalysts which may be employed in accordance with the invention comprises an alkaline earth metal oxide and in addition thereto a readily reducible oxide of a heavy metal, e. g., magnesium oxide and a copper oxide or an iron oxide, or zinc oxide. In lieu of the oxides or sulfides of the heavy metals, there may be employed compounds of heavy metals with acid-reacting bodies, e. g., the phosphides, selenides, manganites, tungstates, etc., the oxides, however, being particularly preferred by reason of their availability and ease of manufacture, as well as because of their particular suitability to the objects of the invention.

When a mixture of two or more materials comprise the catalyst, the respective materials may, in general, be present in any suitable proportion, although most satisfactory results generally are obtained when the catalyst contains an excess (on a molar basis), or contains a major amount, of the alkaline earth metal oxide. A particularly valuable catalyst, because of the efficiency of the process conducted therewith, is one essentially comprising magnesium oxide and zinc oxide, the magnesium oxide being present in a greater molar amount than the zinc oxide, e. g., from about 1.1 to about 50 moles of magnesium oxide per mole of zinc oxide. The catalyst can be supported on a carrier material, such as alumina, silica, kieselguhr, pumice, or the like, or the catalyst mass can consist of the catalytically active material. The catalyst, including the supporting material, if one is used, may be in the form of a fine powder, in the form of compacted pellets or other shaped pieces of suitable size, or it may be used in the form of fragments or other particles of regular or irregular contour. The catalysts may be prepared by any available procedures known to those skilled in the art, a preferred procedure comprising grinding, as by ball-milling, the components of the catalyst with water, removing, as by filtration, enough of the water to leave a stiff paste and extruding or otherwise forming the paste into particles of a desired size which may be dried to provide the catalyst mass. Pilling or pelleting may be used for shaping of catalysts that would be too fragile to handle conveniently as an extrudate. The catalyst, alone or supported on a suitable carrier material, may be used in a dust or "fluidized" form and agitated as a dense pseudo-liquid mass to insure absence of undesired thermal gradients and/or to obtain optimal mixing of the reacting mixture.

The process most conveniently is carried out in a continuous manner, although batchwise or intermittent operations may be used. For the preferred continuous operations the components of the feed are brought into the vapor state in a suitable vaporizer, before or after mixing, and the reaction is effected by passing a gaseous mixture of the feed components through a reaction zone containing the catalyst heated to the desired temperature. The reaction zone advantageously is defined by an elongated tube or tubes wherein the catalyst is positioned. A separate vaporizing means may be employed, or the forepart of the heated reaction zone may serve as vaporizer for liquid feed components fed thereto.

Since the reaction between the alpha-methylidene alkanal and the non-tertiary alcohol is particularly useful when carried out in the vapor phase, the temperature that is employed desirably is sufficient to maintain the reactants in the vapor phase but below that temperature at which substantial decomposition of the reactants and/or the reaction products occurs. In general, the temperature that is used will be between about 200° C. and about 500° C. Temperatures between about 350° C. and about 450° C. are particularly effective when the preferred catalysts containing magnesium oxide are employed. It is an advantage of the process that it most conveniently may be carried out under substantially the atmospheric pressure, although, if desired, moderately subatmospheric or reasonable superatmospheric pressures may be used, a generally suitable range of pressure being from the atmospheric pressure up to, say, 1000 pounds per square inch, a preferred range of pressures being from the atmospheric up to about 100 pounds per square inch.

The feed to the process may contain the non-tertiary alcohol and the alpha-methylidene alkanal in any suitable proportions. It is preferred to have the alcohol present in molecular excess relative to the alpha-methylidene alkanal because of the more substantial yields of the desired beta,gamma-olefinic alcohol that result. A broad suitable range for the molecular ratio of alcohol to alpha-methylidene aldehyde is from about 1:10 to 10:1. A preferred range is from about 2:1 to about 6:1.

When the process is conducted in a continuous manner, the flow rate of the reaction mixture over the heated catalyst is so adjusted that a practical conversion of the alpha-methylidene aldehyde to the desired beta,gamma-olefinic alcohol is obtained, without, however, the excessive occurrence of undesired side reactions leading to products other than that desired. The term "flow rate" as used in the present specification and the appended claims, refers to the total number of moles of the reactants contacted with 100 cc. of the catalyst per minute, the volume of the catalyst being measured in bulk. The optimum flow rate to be employed in any particular case depends in part upon the selected catalyst, as well as upon the specific alpha-methylidene aldehyde and non-tertiary alcohol that are employed, and also upon other conditions of operation, such as the temperature. For each reaction mixture and for each selected catalyst, the flow rate and the temperature can be so regulated that practical conversions of the alpha-methylidene aldehyde to the corresponding beta,gamma-olefinic alcohol are obtained while substantially obviating the occurrence of undesired side reactions. The flow rate that is employed generally will be within the range of up to about 0.8 mole of the reactants per 100 cc. of catalyst per minute, a more limited range being from about 0.075 to about 0.6 mole of reactants per 100 cc. of catalyst per minute. When the operating temperature is within the range of from about 350° C. to about 450° C., and when there is employed a preferred catalyst comprising magnesium oxide, it has been found that optimum conversions of the alpha-methylidene aldehyde to the corresponding beta,gamma-olefinic alcohol are obtained when the flow rate is maintained within the more limited range of from about 0.09 to about 0.3 mole of reactants per 100 cc. of catalyst per minute.

The feed to the catalyst zone ordinarily will comprise only the alpha-methylidene aldehyde and the non-tertiary alcohol, which may contain minor amounts of the impurities normally associated therewith in commercially available materials. If desired, the reaction mixture may be diluted with inert gases such as water, nitrogen, carbon dioxide, or the like, substantially anhydrous reactants or feeds to the reactor preferably being employed. It is desirable to conduct the process in the absence of externally added hydrogen since the presence of added molecular hydrogen tends to lead to side reactions which interfere with, and in many cases may preclude the formation of the desired beta,gamma-olefinic alcohol, such side reactions including, for example, hydrogenation of the alpha-methylidene aldehyde to the corresponding saturated carbonyl compound or the hydrogenation of either or both of the alpha,beta-olefinic carbonyl compound and the desired beta,gamma-olefinic alcohol to the saturated alcohol. In the reaction between the alpha-methylidene aldehyde and a non-tertiary alcohol to produce a beta,gamma-olefinic alcohol containing the same number of carbon atoms as the unsaturated carbonyl reactant it appears that, rather than direct hydrogenating reactions, a bi-molecular reaction involving hydrogen exchange is involved. For example, when acrolein is reacted with ethanol according to the process of the invention, allyl alcohol and acetaldehyde are produced; similarly, the reaction of methacrolein with propyl alcohol produces methallyl alcohol and propionaldehyde, while the reaction of acrolein with isopropanol produces allyl alcohol and acetone. The carbonyl compound which is thus formed by the removal of hydrogen from the non-tertiary alcohol reactant can be separated from the reaction products and hydrogenated by known methods in a separate step to convert it back to the corresponding alcohol which then may be recycled through the process of the invention.

The following examples will illustrate certain of the numerous possible specific embodiments of the invention. It will be appreciated that the examples are presented with the intent to illustrate rather than to limit the invention as it is defined in the appended claims.

*Example I*

A catalyst comprising magnesium oxide and zinc oxide was prepared by grinding about 150 grams of magnesium oxide and about 150 grams of zinc oxide together with about 1500 grams of water in a ball mill for about 16 hours. The resulting mixture was filtered to remove most of the water, leaving a stiff, moist paste of the finely-ground mixture of oxides. The paste was extruded through a die to produce short cylinders about 1/8 inch in diameter, and the extruded paste then was dried at 125° C. for about four hours.

About 100 cc. of the catalyst was placed in a heated steel tube 24 inches long, 5/8 inch inside diameter, and having a 1/4 inch outside diameter thermocouple well extending coaxially throughout its length. The tube was surrounded by a thermostatically-controlled electric heater. The liquid feed components were measured into a heated steel vaporizer from whence the vapors were conveyed through tubing into the heated catalyst zone. Effluent from the reactor was passed through a water-cooled condenser and the portion not condensed at tap-water temperatures was passed through a cold-trap cooled by a mixture of Dry Ice and acetone to collect any low-boiling fractions. The condensed crude products were combined and fractionally distilled to recover the reaction products and any unreacted reactants.

Acrolein and ethyl alcohol were vaporized and passed together over the catalyst prepared as above, at a temperature of about 390° C. and a flow rate of approximately 2 cc. of acrolein and 4 cc. of ethyl alcohol per 100 cc. of catalyst per minute. By fractional distillation of the condensed effluent from the reactor, the products were found to contain allyl alcohol and acetaldehyde. The yield of allyl alcohol was 71.1%, based on the amount of acrolein consumed.

*Example II*

In a further experiment similar to that described in Example I, 14 moles of acrolein and 32 moles of ethyl alcohol were passed together during a period of 13½ hours over a catalyst prepared as in Example I containing magnesium oxide and zinc oxide in a 2:1 molar ratio. The average temperature of the catalyst during the run was 395° C., the maximum recorded temperature being 400° C. A flow rate of about 0.1 total mole of reactants per 100 cc. of catalyst per minute was employed. During the run the yield of allyl alcohol, based upon the amount of acrolein consumed, averaged about 71%. During the course of the experiment, the conversion rate gradually declined and at the end of the run the catalyst had a slightly gray appearance which appeared to be due to accumulated carbon. At the conclusion of the run, the feed to the reactor was discontinued, a stream of air was swept over the catalyst while the catalyst was heated to a temperature of about 480° C. maximum. The acrolein-ethyl alcohol feed to the catalyst then was restored. During the succeeding six hours, allyl alcohol was produced in a yield averaging about 85%, based upon the amount of acrolein consumed.

As shown in Example II, the process may be interrupted at any convenient time to permit regeneration of the catalyst, for example, by burning with air to remove carbon and organic materials which may have accumulated, or by any other suitable procedure. The reactivation or regeneration of the catalyst is preferably effected without removing the catalyst from the reaction tube or chamber. The reactivation is readily accomplished by passing air or other gaseous mixture containing molecular oxygen into contact with the catalyst at an elevated temperature, if desired in the presence of an added inert or active gas, such as steam, carbon dioxide, nitrogen, etc. The reactivation preferably is carried out at temperatures within the range of from about 350° C. to about 900° C. When a catalyst such as a magnesium-zinc oxide catalyst, is to be regenerated, it generally is preferable to employ peak temperatures of about 550° C. Temperatures greater than about 900° C. are usually to be avoided, since they may cause undesired changes in the physical structure of the catalyst and permanently affect its activity. The necessary duration of the regeneration treatment will depend upon various factors, such as the conditions used and the amount of accumulated carbon and/or organic materials present on the catalyst. The reactivation in many cases can be completed within not over one or two hours. The process period of the catalysts may be varied according to the rate of accumulation of carbonaceous materials on the catalyst. The process has been carried out successfully in continuous runs of 15 hours or more without reactivation treatments and longer on-stream periods are possible. In certain cases, as when the catalyst comprises a metal or a compound of such a metal, that forms readily reducible oxides, it may be desirable to follow the oxidation or calcining treatment with a treatment by a reducing gas, such as hydrogen. For example, a magnesia catalyst containing copper advantageously is calcined or regenerated at about 500° C., and then prior to use, according to the invention, reduced by treatment with hydrogen at an elevated temperature, say about 475° C.

Example III

The catalyst was prepared from 66 parts by weight of magnesium oxide and 34 parts by weight of zinc oxide by the procedure described in Example I. Using the apparatus described in Example I, a mixture of 2.58 moles of acrolein and 15.85 moles of ethyl alcohol was passed over the catalyst heated to an average temperature of 396° at a flow rate of 0.160 mole per 100 cc. of catalyst per minute. The collected effluent from the reactor was found to contain 1.47 moles of allyl alcohol, corresponding to a 57% conversion of acrolein to allyl alcohol and to a 77% yield of allyl alcohol based upon the acrolein consumed. From the reactor effluent there were recovered 13.43 moles of unreacted ethyl alcohol and 0.67 mole of unreacted acrolein in a purity suitable for recycle.

Example IV

The catalyst for this example was prepared by grinding magnesia with water, filtering and extruding the moist base and drying in accordance with the method described in Example I. A mixture of 5.1 moles of acrolein and 30.9 moles of ethyl alcohol was passed over the catalyst at a flow rate of 0.099 mole per 100 cc. of catalyst per minute, the average temperature of the catalyst being about 396° C. During the first hour's operation, allyl alcohol was recovered from the collected reaction products in a yield of 51% based upon the acrolein consumed and in a conversion of 41% based upon the acrolein applied. By the third hour's operation the yield had increased to 85% and the conversion to 59%. During the 14th hour of operation allyl alcohol was being produced in a yield of 94%, based upon the acrolein consumed, and in a conversion of 48%. Of the acrolein applied during this last hour's operation, 49% was recovered in a form suitable for recycle.

Example V

A mixture of 1.91 moles of acrolein and 22.4 moles of ethyl alcohol passed over a magnesia catalyst prepared as in the preceding example at a flow rate of 0.198 mole per 100 cc. of catalyst per minute at a temperature of 393° C. was converted to allyl alcohol in a conversion of 61% based upon the acrolein applied and a yield of 73% based upon the acrolein consumed.

Example VI

Acrolein and isopropyl alcohol in a molar ratio of about 1:2 were passed over a catalyst prepared as in Example I at a flow rate of about 0.085 mole per 100 cc. of catalyst per minute at a temperature of 402° C. to 416° C. The yield of allyl alcohol was about 53%, based upon the acrolein consumed.

Example VII

Methyl alcohol and acrolein in a molar ratio of about 2:1 were passed over a catalyst prepared as in Example I at a flow rate of about 0.089 mole per 100 cc. of catalyst per minute at an average temperature of about 400° C. The yield of allyl alcohol was about 22.4% based upon the acrolein consumed.

Example VIII

A mixture of the vapors of ethyl alcohol and acrolein in a mole ratio of about 2.3:1 was passed at a flow rate of about 0.099 mole per 100 cc. of catalyst per minute over a catalyst composed of magnesia and zinc oxide in a mole ratio of about 4:1, which had been prepared as in Example I but prior to use had been calcined at 700° C. for four hours. At an average operating temperature of about 390° C. and a maximum of about 401° C., the yield of allyl alcohol was about 71%, based upon the amount of acrolein consumed.

Example IX

Approximately 1.75 moles of methacrolein and about 10.1 moles of ethyl alcohol were vaporized and passed together over a catalyst comprising magnesium oxide and zinc oxide in about a 4:1 molar ratio, at a flow rate of about 0.099 mole of reactants per 100 cc. of catalyst per minute. The temperature of the catalyst averaged about 395° C. with a maximum of about 405° C. Methallyl alcohol was recovered from the condensed reactor effluent by distillation, in a conversion of about 61.2%, based upon the methacrolein applied, and in an approximately 90% yield, based upon the methacrolein consumed.

Example X

The catalyst used in this example was prepared by grinding with water in a ball mill a mixture of about 95 parts by weight of magnesium oxide and about 5 parts by weight of copper oxide, and then filtering, extruding, and drying, as in Example I. Prior to use, the catalyst was treated with hydrogen at about 250° C. to reduce the copper oxide in part to a mixture of metallic copper and cuprous oxide. A gaseous mixture of 1.39 moles of acrolein and 3.39 moles of ethyl alcohol, when passed over the catalyst at a flow rate of about 0.096 mole per 100 cc. of catalyst per minute and at a temperature of about 370° C., formed allyl alcohol in a yield of approximately 55% based upon the acrolein consumed.

Example XI

In this example the catalyst was prepared by finely grinding with water in a ball mill a mixture of about equal parts by weight of ferric oxide and magnesium oxide, and then filtering, extruding and drying as in Example I. Ethyl alcohol and acrolein in a mole ratio of about 2.6:1 were vaporized and passed over the catalyst at a flow rate of about 0.098 mole per 100 cc. of catalyst per minute and at an average temperature of about 353° C. The yield of allyl alcohol was about 68.6% based upon the amount of acrolein fed.

Example XII

A catalyst containing about 10 parts by weight of zinc oxide and 1 part by weight of calcium oxide supported upon activated alumina was prepared by impregnating activated alumina with an aqueous solution of zinc nitrate and calcium nitrate, drying the impregnated carrier and converting the nitrates to the oxides by heating in air. A gaseous mixture of approximately 1.68 moles of acrolein and 10.15 moles of ethyl alcohol was passed over the catalyst at a flow rate of about 0.099 mole of reactants per 100 cc. of catalyst per minute, at an average temperature of about 325° C. Allyl alcohol was produced in a conversion of 42.5%, based upon the acrolein supplied and in a yield of about 71%, based upon the acrolein consumed.

Example XIII

A magnesia-tantalum oxide catalyst was prepared by ball milling with water a mixture of about 90 parts by weight of magnesium oxide and about 10 parts by weight of tantalum pentoxide, and then filtering the resulting slurry, extruding and drying, as in Example I. A gaseous mixture of 1.71 moles acrolein and 10 moles ethyl alcohol was passed over the catalyst at a flow rate of 0.10 mole per 100 cc. of catalyst per minute at a temperature of 375° C. to 391° C. Allyl alcohol was produced in a yield of 64%, based upon the acrolein consumed and in a conversion of 42.3%, based upon the acrolein applied.

Example XIV

A magnesium oxide-zinc oxide catalyst containing 80 mole percent MgO was prepared by wet grinding together magnesia and zinc oxide, extruding the paste, and drying. Benzyl alcohol and acrolein in mole ratio 6:1 were passed together over the catalyst at 350° C. and a flow rate of about 0.1 mole of reactants per 100 cc. of catalyst per minute. Of the acrolein fed, 91% was converted. The yield of allyl alcohol based on the acrolein was 80%.

*Example XV*

Over a pelleted magnesia catalyst prepared by the method illustrated in the preceding example, acrolein and 3,3,5-trimethylcyclohexanol were reacted at a mole ratio of 1:3, a temperature of 350° C. and flow rate of 0.1 mole per 100 cc. of catalyst per minute to produce a 53% yield of allyl alcohol, based on the acrolein, at a 50% conversion of the acrolein fed. With the same catalyst and under the same reaction conditions the reaction of acrolein with furfuryl alcohol produced allyl alcohol in 58% yield at a 30% conversion of the acrolein fed.

The beta,gamma-olefinic alcohols which can be produced by the process of the invention are useful in a variety of technical applications. They are of value as resin intermediates, as special solvents, and as chemical intermediates for the preparation of a wide variety of useful chemical compounds. The process of the invention provides for the first time a technically practical method for the production of these useful unsaturated alcohols by selective reduction of alpha,beta-olefinic carbonyl compounds.

This application is a continuation-in-part of our copending application Serial No. 148,014, filed March 6, 1950, now abandoned, which in turn is a continuation-in-part of application Serial No. 633,860, filed December 8, 1945, now abandoned.

We claim as our invention:

1. A process for the production of a beta,gamma-olefinically unsaturated alcohol which comprises passing a vaporous stream comprising a lower alpha-methylidene alkanal and an excess relative thereto on a molar basis of an alcohol having hydrogen directly attached to carbon on which the hydroxyl group is substituted into contact with a catalyst consisting essentially of oxide of group II metal at a temperature of from about 200° C. to about 500° C. and recovering the corresponding beta,gamma-olefinically unsaturated alcohol containing the same number and arrangement of carbon atoms as the carbonylic reactant from the resulting mixture.

2. The process defined by claim 1 in which the said vaporous stream is passed into contact with the catalyst at a rate less than about 0.8 mole of the said reactants per 100 cubic centimeters of the catalyst per minute.

3. The process defined by claim 1 conducted at a pressure within the range of from about atmospheric pressure up to about 100 pounds per square inch.

4. The process defined by claim 1 in which the alcohol reactant is benzyl alcohol.

5. The process defined by claim 4 in which the alpha-methylidene alkanal is acrolein.

6. The process defined by claim 1 in which the alcohol reactant is ethanol.

7. The process defined by claim 6 in which the alpha-methylidene alkanal is acrolein.

8. A continuous process for the production of a beta,-gamma-olefinically unsaturated alcohol which comprises passing a lower alpha-methylidene alkanal and an excess relative thereto on molar basis of a lower aliphatic alcohol having hydrogen directly attached to carbon on which the hydroxyl group is substituted into contact in vapor phase with a catalyst consisting essentially of oxide of group II metal at a temperature of from about 200° C. to about 500° C. at a rate of from about 0.075 to about 0.6 mole of said reactants per 100 cubic centimeters of the catalyst per minute and recovering from the resulting mixture the corresponding beta, gamma-olefinically unsaturated alcohol containing the same number and arrangement of carbon atoms as the carbonylic reactant.

9. A continuous process for the production of a lower primary 2-alkenol which comprises passing a lower alpha-methylidene alkanal and a lower aliphatic alcohol having hydrogen directly attached to carbon on which the hydroxyl group is substituted into contact in vapor phase with a catalyst consisting essentially of oxide of group II metal at a temperature of from about 200° C. to about 500° C. at a rate of from about 0.075 to about 0.6 mole of said reactants per 100 cubic centimeters of the catalyst per minute and recovering the corresponding primary 2-alkenol from the resulting mixture.

10. The process defined by claim 9 in which the catalyst is composed of magnesium oxide.

11. A continuous process for the production of allyl alcohol which comprises passing acrolein and an excess relative thereto on molar basis of a lower alkenol having hydrogen directly attached to the carbon atom on which the hydroxyl group is substituted into contact with a catalyst consisting essentially of oxide of group II metal at a temperature of from about 200° C. to about 500° C. at a rate of from about 0.075 to about 0.6 mole of said reactants per 100 cubic centimeters of the catalyst per minute and recovering allyl alcohol from the resulting mixture.

12. A continuous process for the production of methallyl alcohol which comprises passing methacrolein and ethanol in proportions corresponding to a mole ratio of ethanol to methacrolein of from about 2:1 to about 6:1 into contact in vapor phase with a catalyst consisting essentially of magnesium oxide and zinc oxide at a temperature of from about 350° C. to about 450° C. at a rate of from about 0.09 to about 0.3 mole of said reactants per 100 cubic centimeters of catalyst per minute and recovering methallyl alcohol from the resulting mixture.

13. A continuous process for the production of allyl alcohol which comprises passing acrolein and ethanol in proportions corresponding to a mole ratio of ethanol to acrolein of from about 2:1 to about 6:1 into contact with magnesia as the sole catalyst at a temperature of from about 350° C. to about 450° C. at a rate of from about 0.09 to about 0.3 mole of said reactants per 100 cubic centimeters of catalyst per minute and recovering allyl alcohol from the resulting mixture.

References Cited in the file of this patent

UNITED STATES PATENTS

| | | |
|---|---|---|
| 2,009,948 | Schmidt et al. | July 30, 1935 |
| 2,156,217 | Andrews et al. | Apr. 25, 1939 |